United States Patent
Ishihata et al.

(10) Patent No.: US 9,578,525 B2
(45) Date of Patent: Feb. 21, 2017

(54) BASE STATION, COMMUNICATION TERMINAL, AND CALL REGULATION CONTROL METHOD

(71) Applicant: FUJITSU LIMITED, Kawasaki-shi, Kanagawa (JP)

(72) Inventors: Yoshihisa Ishihata, Kawasaki (JP); Yutaka Kobayashi, Yokohama (JP); Takayuki Ohtsuka, Kawasaki (JP); Masaya Isobe, Kawasaki (JP); Hiroyasu Taguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/738,055

(22) Filed: Jun. 12, 2015

(65) Prior Publication Data
US 2015/0281982 A1    Oct. 1, 2015

Related U.S. Application Data

(63) Continuation of application No. PCT/JP2012/082844, filed on Dec. 18, 2012.

(51) Int. Cl.
*H04W 24/04* (2009.01)
*H04W 16/32* (2009.01)
*H04W 88/08* (2009.01)

(52) U.S. Cl.
CPC ............ *H04W 24/04* (2013.01); *H04W 16/32* (2013.01); *H04W 88/08* (2013.01)

(58) Field of Classification Search
CPC ......... H04W 24/04; H04W 4/12; H04W 68/00
See application file for complete search history.

(56) References Cited

U.S. PATENT DOCUMENTS

| | | | |
|---|---|---|---|
| 2010/0159991 A1* | 6/2010 | Fu | H04W 24/02 455/561 |
| 2011/0287772 A1* | 11/2011 | Park | H04W 24/04 455/450 |

FOREIGN PATENT DOCUMENTS

| | | |
|---|---|---|
| EP | 2387266 A2 | 11/2011 |
| JP | 2010-56881 | 3/2010 |
| JP | 2010-166272 | 7/2010 |
| JP | 2011-250263 | 12/2011 |
| WO | 2010/077002 A2 | 7/2010 |

OTHER PUBLICATIONS

EESR—The Extended European Search Report for European Patent Application No. 12890459.6, mailed on Nov. 12, 2015.
International Search Report, mailed in connection with PCT/JP2012/082844 and mailed Apr. 2, 2013.

* cited by examiner

*Primary Examiner* — Myron K Wyche
(74) *Attorney, Agent, or Firm* — Fujitsu Patent Center

(57) ABSTRACT

A base station includes a monitoring unit that monitors whether a supply of electrical power to a first other base station that forms another communication area that is overlapped with a communication area formed by the own station is stopped, and a wireless communication unit that sends, when the supply of the electrical power to the first other base station is stopped, first key data by using a first channel and that sends, after sending the first key data, second key data that is the same as the first key data and a transmission regulation notification indicating that call regulation is performed on the own station by using a second channel.

5 Claims, 15 Drawing Sheets

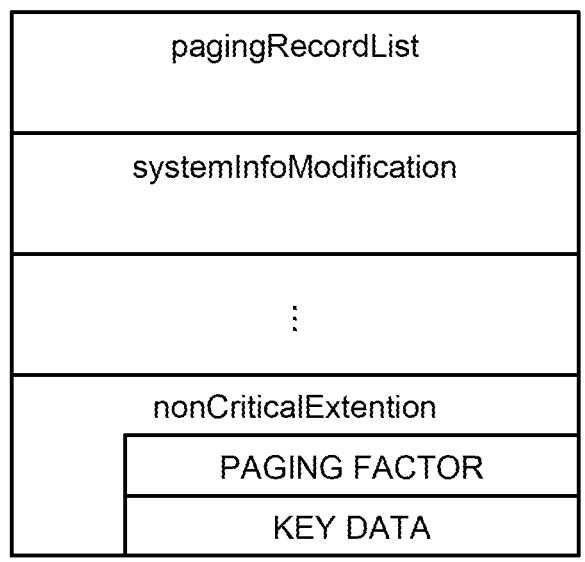

BASE STATION, COMMUNICATION TERMINAL, AND CALL REGULATION CONTROL METHOD

CROSS-REFERENCE TO RELATED APPLICATION

This application is a continuation of International Application No. PCT/JP2012/082844, filed on Dec. 18, 2012, the entire contents of which are incorporated herein by reference.

FIELD

The embodiments discussed herein are related to a base station, a communication terminal, and a call regulation control method.

BACKGROUND

In the current mobile unit communication system, mainly, communication services are provided by base stations each of which forms a macrocell that is a wide communication area. In a description below, a base station that forms a macrocell is sometimes referred to as a "macro base station".

However, an area, such as the inside of a building, in which a radio wave transmitted from a macro base station is hardly reached, sometimes becomes an out-of-communication-service area or a non-detection area, such as an area in which communication is unstable. Accordingly, measures are taken to relieve this non-detection area such that a small-size base station with small transmission electrical power is arranged in a macrocell and, by using this small-size base station, a femtocell whose communication area is smaller than that of the macrocell is formed in the macrocell. In a description below, a small-size base station that forms a femtocell is sometimes referred to as a "femto base station".

Because a femto base station is usually arranged inside of a building, the femto base station is connected to a mobile telecommunication network via a public line, such as a broadband line arranged inside of the building. Furthermore, the femto base station provides the same communication service as that provided by the macro base station with respect to a communication terminal that is used by a user. Because the femto base station is connected to a mobile telecommunication network by using a public line, no dedicated line is needed to arrange the femto base station. Accordingly, for mobile unit telecommunication carriers, due to the arrangement of femto base stations, it is possible to take measures against non-detection areas at low cost, which is an advantage. Furthermore, due to the arrangement of the femto base station in a macrocell, it is possible to accommodate a communication terminal, which is conventionally accommodated in a macro base station, in the femto base station. Consequently, for mobile unit telecommunications carriers, due to the arrangement of the femto base station, an advantage is provided in that the communication resources in a macrocell can be efficiently used. Furthermore, due to the arrangement of the base station inside of a building, for a user of a communication terminal, an advantage is provided in that the state of a radio wave is improved and high-quality and large-volume communication is possible.

In recent years, with the development of high-performance communication terminals represented by smart phones, because data communication traffics are dramatically increased, it is difficult, only for macrocells, to satisfy demands of users who use high-quality communication terminals. Accordingly, in recent years, the femto base stations having various advantages are actively installed.

Related-art examples are described, for example, in Japanese Laid-open Patent Publication No. 2010-166272, Japanese Laid-open Patent Publication No. 2010-056881 and Japanese Laid-open Patent Publication No. 2011-250263.

Because femto base stations are often arranged in a macrocell as the measurements against a non-detection area in the macrocell, femtocells are often used in a manner such that the femtocells overlap with macrocells. Furthermore, in case of a power failure of a main power supply, a standby power supply functioning as an emergency power supply is connected to a typical macro base station. Thus, even if a power failure occurs in the main power supply, the macro base station can continue a communication service by switching the power supply from the main power supply to the standby power supply.

In contrast, because a typical femto base station does not include a standby power supply in case of a power failure, if a supply of electrical power from the main power supply to the femto base station is stopped due to the occurrence of a power failure or the like, the typical femto base station is not able to continue the communication service. Due to a stop of the communication service of the femto base station, a plurality of communication terminals accommodated in a femto base station simultaneously sends a location registration request to a macro base station. Consequently, in a macrocell, due to a stop of the communication service of the femto base station, congestion of communication data sometimes occurs. If congestion of the communication data occurs in a macrocell, a communication delay may sometimes occur in the communication of the communication terminals that are originally accommodated in a macrocell. Furthermore, if a core network located in a level higher than that of the macrocell detects congestion in the macrocell and thus performs call regulation on the entirety of the macrocell, the call regulation is also performed on the communication terminals that are originally accommodated in the macrocell. Consequently, a stop of the communication service of the femto base station adversely affect, such as a communication delay, call regulation, or the like, the communication terminals that are originally accommodated in the macrocell.

SUMMARY

According to an aspect of an embodiment of the invention, a base station includes a monitoring unit that monitors whether a supply of electrical power to a first other base station that forms another communication area that is overlapped with a communication area formed by the own station is stopped, and a wireless communication unit that sends, when the supply of the electrical power to the first other base station is stopped, first key data by using a first channel through which a first communication terminal accommodated in the own station is capable of receiving the first key data and a second communication terminal accommodated in the first other base station is not capable of receiving the first key data and that sends, after sending the first key data, second key data that is the same as the first key data and a transmission regulation notification indicating that call regulation is performed on the own station by using a second channel through which both the first communication terminal and the second communication terminal are capable of receiving the second key data and the transmission regulation notification.

According to another aspect of an embodiment, a communication terminal includes a wireless communication unit that is capable of receiving first key data by using a first channel through which a first communication terminal accommodated in a first base station is capable of receiving the first key data and through which a second communication terminal accommodated in a second base station that forms a second communication area that is overlapped with a first communication area formed by the first base station is not capable of receiving the first key data and that is capable of receiving second key data that is the same as the first key data and a transmission regulation notification indicating that call regulation is performed on the first base station by using a second channel through which both the first communication terminal and the second communication terminal are capable of receiving the second key data and the transmission regulation notification, and a regulating unit that does not regulate transmission from the own terminal when the transmission regulation notification is received and the received second key data matches the received first key data, that regulates transmission from the own terminal when the transmission regulation notification is received and the first key data is not received before the second key data is received, and that regulates transmission from the own terminal when the transmission regulation notification is received and the received second key data is different from the received first key data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a schematic diagram illustrating an example of call regulation key data according to the first embodiment.

FIG. 7 is a schematic diagram illustrating an example of a paging message according to the first embodiment.

DESCRIPTION OF EMBODIMENTS

Figure 1:
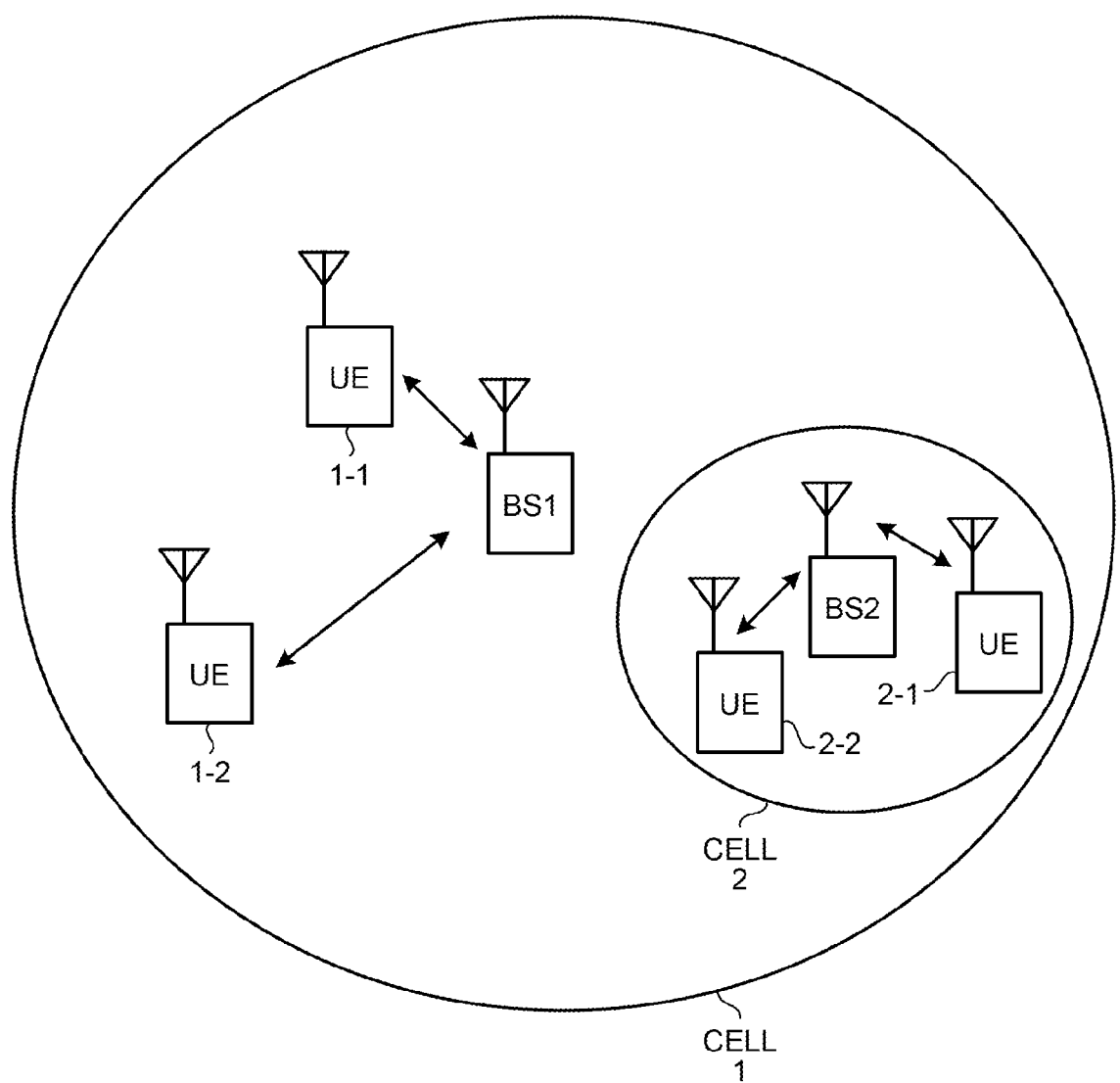
FIG. 1 is a schematic diagram illustrating an example of a communication system according a first embodiment.

Preferred embodiments of a base station, a communication terminal, and a call regulation control method disclosed in the present invention will be described in detail below with reference to the accompanying drawings. The base station, the communication terminal, and the call regulation control method disclosed in the present invention are not limited to the embodiments described below. Furthermore, in the embodiments described below, components that have the same function and steps at each of which the same process is performed are assigned the same reference numerals; therefore, descriptions of overlapped portions will be omitted.

[a] First Embodiment

Configuration of a Communication System

FIG. 1 is a schematic diagram illustrating an example of a communication system according a first embodiment. As illustrated in FIG. 1, a base station BS1 forms a cell 1 that is a communication area of the own station and accommodates communication terminals UE1-1 and UE1-2. The cell 1 is a macrocell. In contrast, a base station BS2 forms, in the cell 1, a cell 2 that is a communication area of the own station and accommodates communication terminals UE2-1 and UE2-2. The cell 2 is a femtocell. Furthermore, the entirety of the cell 2 is overlapped with the cell 1.

Here, the "base station that accommodates communication terminals" means the "base station that forms a cell in which location registration of the communication terminals has already been performed". For example, in FIG. 1, the location of each of the communication terminals UE1-1 and UE1-2 has already been registered in the cell 1. Similarly, the location of each of the communication terminals UE2-1 and UE2-2 has already been registered in the cell 2.

<Configuration of a Base Station>

Figure 2:
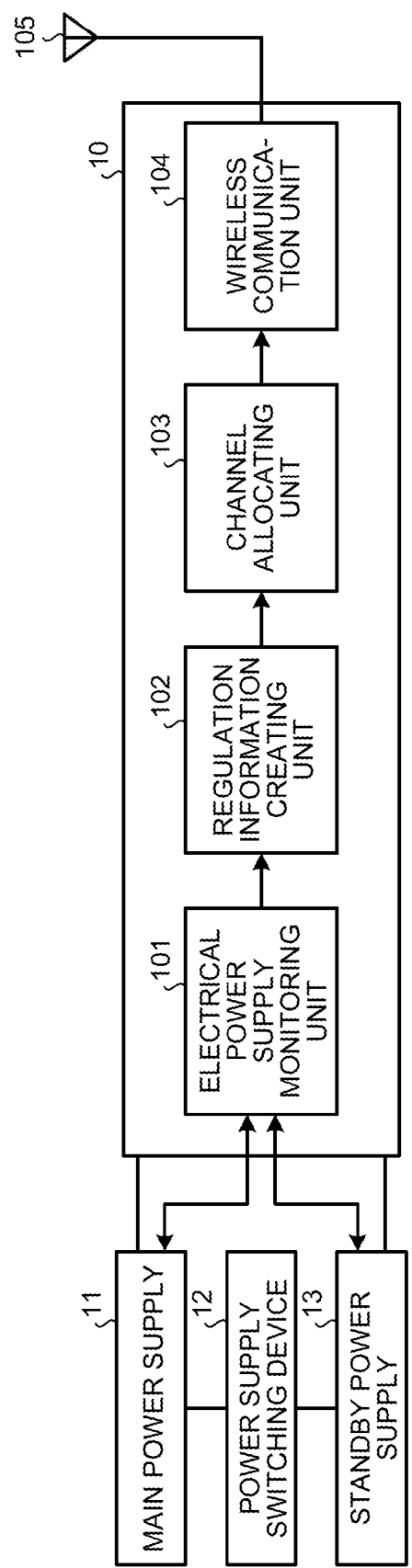
FIG. 2 is a functional block diagram illustrating an example of a base station according to the first embodiment.

FIG. 2 is a functional block diagram illustrating an example of a base station according to the first embodiment. A base station 10 illustrated in FIG. 2 corresponds to the base station BS1 illustrated in FIG. 1.

In FIG. 2, the base station 10 includes an electrical power supply monitoring unit 101, a regulation information creating unit 102, a channel allocating unit 103, a wireless communication unit 104, and an antenna 105.

Furthermore, a main power supply 11 functioning as a power supply and a standby power supply 13 functioning as an emergency power supply arranged in case of a power failure of the main power supply 11 are connected to the base station 10. The main power supply 11 is, for example, a commercial power supply provided by an electrical power supply company. Furthermore, the standby power supply 13 may also be arranged outside the base station 10 or may also be arranged inside the base station 10. If the standby power supply 13 is arranged outside the base station 10, the standby power supply 13 is a power supply facility that can generate electrical power by using, for example, gas or oil as a fuel. If the standby power supply 13 is arranged inside the base station 10, the standby power supply 13 is, for example, a large-size battery. The standby power supply 13 is also referred to as a "backup power supply".

A power supply switching device 12 switches, when a power failure occurs in the main power supply 11, a power supply, which supplies electrical power to the base station 10, from the main power supply 11 to the standby power supply 13. Furthermore, if the power failure of the main power supply 11 is recovered, the power supply switching device 12 switches the power supply, which supplies electrical power to the base station 10, from the standby power supply 13 to the main power supply 11. The power supply switching device 12 may also be arranged outside the base station 10 or inside the base station 10.

The electrical power supply monitoring unit 101 monitors whether a supply of the electrical power to the base station BS2 illustrated in FIG. 1 is stopped. As illustrated in FIG. 1, the base station BS2 is a base station that forms the cell 2 that is overlapped with the cell 1 that forms the base station BS1.

Here, because the base station BS2 is arranged in the cell 1 that is formed by the base station BS1, there is a high possibility that the main power supply 11 that supplies electrical power to the base station BS1 also supplies electrical power to the base station BS2. Specifically, there is a high possibility that both the base station BS1 and the base station BS2 receive a supply of electrical power from the same main power supply 11. Consequently, if a supply of the electrical power from the main power supply 11 to the base station BS1 is stopped due to a power failure of the main power supply 11, there is a high possibility that the supply of the electrical power from the main power supply 11 to the base station BS2 is also stopped. Accordingly, the electrical power supply monitoring unit 101 monitors the state of an electrical power supply from each of the main power supply 11 and the standby power supply 13. Then, the electrical power supply monitoring unit 101 detects that the electrical power supply source to the own station (base station BS1) is switched from the main power supply 11 to the standby power supply 13 as the detection of a state in which a supply of the electrical power to the base station BS2 is stopped. Furthermore, the electrical power supply monitoring unit 101 may also detect that the electrical power supply source to the own station is switched from the main power supply 11 to the standby power supply 13 by receiving a notification from the power supply switching device 12 indicating that the power supply that supplies the electrical power to the base station 10 has been switched from the main power supply 11 to the standby power supply 13. When the electrical power supply monitoring unit 101 detects that the supply of the electrical power to the base station BS2 is stopped, the electrical power supply monitoring unit 101 outputs, to the regulation information creating unit 102, a notification indicating that the stopping of the electrical power supply has been detected (hereinafter, sometimes be simply referred to as a "detection notification").

When a detection notification is input from the electrical power supply monitoring unit 101, the regulation information creating unit 102 creates key data and a transmission regulation notification (hereinafter, sometimes be simply referred to as a "regulation notification") that is a notification indicating that call regulation is performed on the own station (base station BS1). The regulation information creating unit 102 outputs the created key data and the created regulation notification to the channel allocating unit 103.

The channel allocating unit 103 allocates the key data to a first channel through which the communication terminals UE1-1 and UE1-2 accommodated in the own station (base station BS1) are capable of receiving the key data and the communication terminals UE2-1 and UE2-2 accommodated in the base station BS2 are not capable of receiving the key data. The first channel is, for example, a Paging Channel (PCH). The PCH is a common channel in the downlink direction and is used to send a paging message. Namely, the channel allocating unit 103 includes the key data in the paging message.

Furthermore, the channel allocating unit 103 allocates the key data and the regulation notification to a second channel through which the communication terminals UE1-1 and UE1-2 and the communication terminals UE2-1 and UE2-2 are capable of receiving the key data and the regulation notification. The second channel is, for example, a broadcast channel (BCH). The BCH is a common channel in the downlink direction and is used to send a broadcast message that includes therein system information, cell information, or the like. Namely, the channel allocating unit 103 includes the key data and the regulation notification in a broadcast message. A broadcast message is sometimes referred to as a report message or notification information. Furthermore, the reach range of a broadcast message corresponds to a communication area of the base station 10.

After the key data and the regulation notification have been created, the channel allocating unit 103 outputs, to the wireless communication unit 104 at a first transmission timing, the paging message that includes therein the key data and then outputs, to the wireless communication unit 104 at a second or the subsequent transmission timing, the broadcast message that includes therein the key data and the regulation notification. The key data included in the paging message and the key data included in the broadcast message are almost the same key data. In a description below, the key data included in the paging message is sometimes referred to as "key data (PCH)" and the key data included in the broadcast message is sometimes referred to as "key data (BCH)".

After the key data and the regulation notification have been created, the wireless communication unit 104 sends, via the antenna 105 at a first transmission timing, the paging message that includes therein the key data and then outputs, via the antenna 105 at a second or the subsequent transmission timing, the broadcast message that includes therein the key data and the regulation notification. Namely, when a supply of electrical power to the base station BS2 is stopped, the wireless communication unit 104 sends the key data (PCH) as first key data by using a PCH through which the communication terminals UE1-1 and UE1-2 are capable of receiving the key data (PCH) and the communication terminals UE2-1 and UE2-2 are not capable of receiving the key data (PCH). Furthermore, when a supply of electrical power to the base station BS2 is stopped, the wireless communication unit 104 sends the key data (BCH), as second or the subsequent key data, that is the same as the key data (PCH) by using a BCH through which the communication terminals UE1-1 and UE1-2 and the communication terminals UE2-1 and UE2-2 are capable of receiving the key data (BCH).

<Process Performed by the Base Station>

Figure 3:
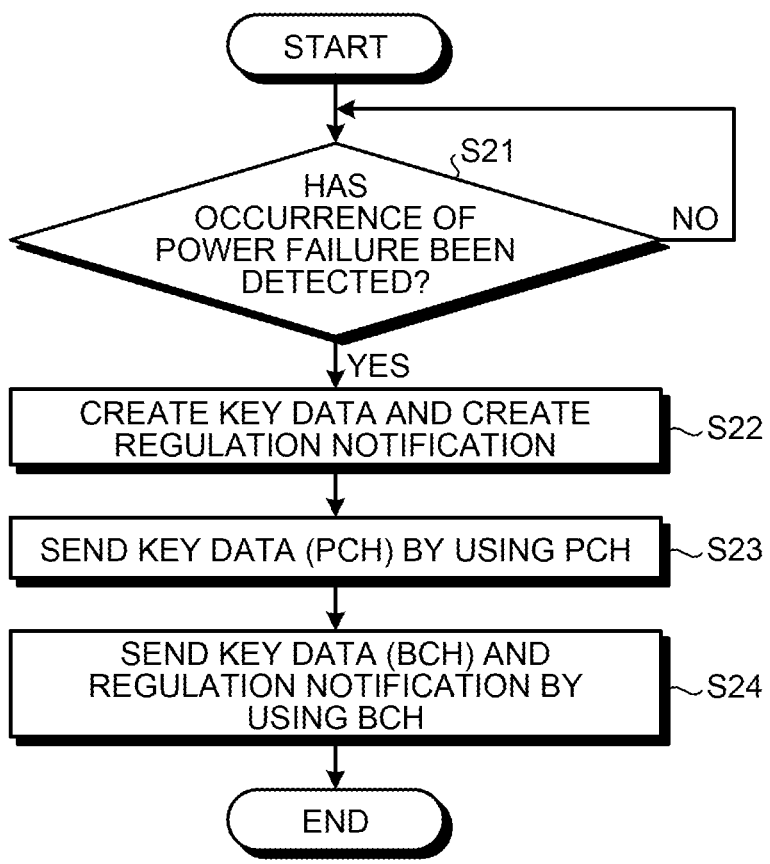
FIG. 3 is a flowchart illustrating the flow of a process performed by the base station according to the first embodiment.

FIG. 3 is a flowchart illustrating the flow of a process performed by the base station according to the first embodiment.

In the base station 10 that corresponds to the base station BS1, the electrical power supply monitoring unit 101 monitors whether a power failure of the main power supply 11 has occurred in the base station BS2, i.e., whether a supply of electrical power to the base station BS2 is stopped (No at Step S21).

If the electrical power supply monitoring unit 101 detects the occurrence of the power failure of the main power supply 11 in the base station BS2 (Yes at Step S21), the regulation information creating unit 102 creates the key data and a regulation notification (Step S22).

Then, the wireless communication unit 104 sends the key data (PCH) by using the PCH (Step S23), and sends, after sending the key data (PCH), the key data (BCH) and the regulation notification by using the BCH (Step S24).

<Configuration of the Communication Terminal>

Figure 4:
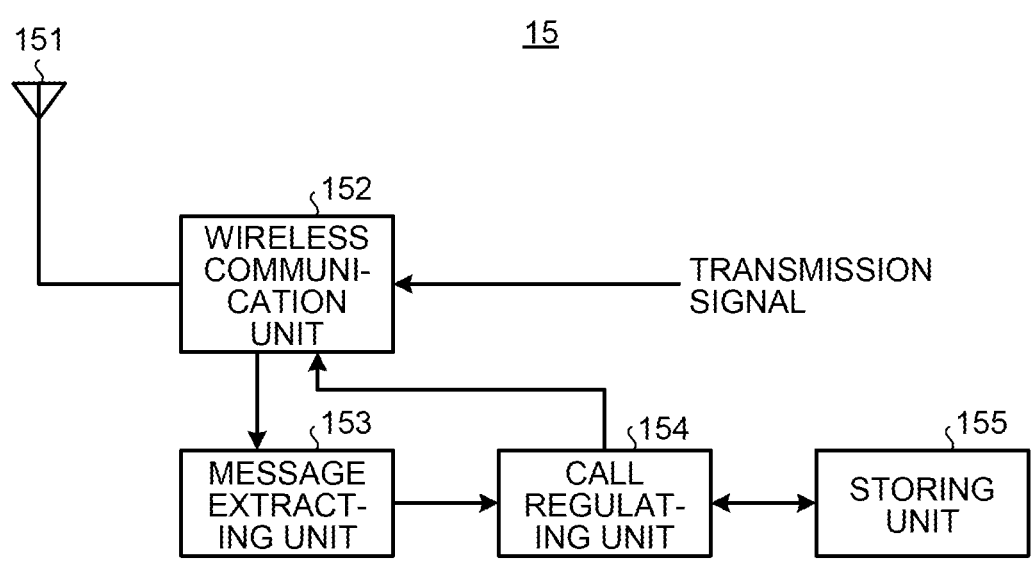
FIG. 4 is a functional block diagram illustrating an example of a communication terminal according to the first embodiment.

FIG. 4 is a functional block diagram illustrating an example of a communication terminal according to the first embodiment. A communication terminal 15 illustrated in FIG. 4 corresponds to the communication terminals UE1-1 and UE1-2 and the communication terminals UE2-1 and UE2-2 illustrated in FIG. 1.

In FIG. 4, the communication terminal 15 includes an antenna 151, a wireless communication unit 152, a message extracting unit 153, a call regulating unit 154, and a storing unit 155.

The wireless communication unit 152 is capable of receiving a signal by using the PCH and the BCH. The wireless communication unit 152 outputs the signal received via the antenna 151 to the message extracting unit 153. Furthermore, the wireless communication unit 152 sends a transmission signal via the antenna 151 under the control of the call regulating unit 154.

The communication terminals UE1-1 and UE1-2 are accommodated in the base station BS1. Consequently, if the communication terminal 15 corresponds to the communication terminals UE1-1 and UE1-2, both the paging message and the broadcast message are received by the communication terminal 15 from the base station 10 that corresponds to the base station BS1. In contrast, the communication terminals UE2-1 and UE2-2 are accommodated in the base station BS2. Consequently, if the communication terminal 15 corresponds to the communication terminals UE2-1 and UE2-2, the broadcast message is received by the communication terminal 15 from the base station 10 that corresponds to the base station BS1; however, the paging message is not received. Consequently, the key data (PCH), the key data (BCH), and the regulation notification are received by the communication terminal 15, which corresponds to the communication terminals UE1-1 and UE1-2, from the base station 10, which corresponds to the base station BS1. In contrast, the key data (BCH) and the regulation notification are received, by the communication terminal 15, which corresponds to the communication terminals UE2-1 and UE2-2, from the base station 10, which corresponds to the base station BS1; however, the key data (PCH) is not received.

Accordingly, the message extracting unit 153 determines whether a paging message is included in the input received signal, i.e., whether a paging message has been received. If a paging message is included in the received signal, the message extracting unit 153 extracts the paging message from the received signal and determines whether the extracted paging message includes the key data (PCH). If the paging message includes therein the key data (PCH), the message extracting unit 153 extracts the key data (PCH) from the paging message and outputs the extracted key data (PCH) to the call regulating unit 154.

Furthermore, the message extracting unit 153 determines whether a broadcast message is included in the input received signal, i.e., whether a broadcast message has been received. If a broadcast message is included in the received signal, the message extracting unit 153 extracts the broadcast message from the received signal and determines whether the extracted broadcast message includes therein the key data (BCH) and the regulation notification. If the broadcast message includes the key data (BCH) and the regulation notification, the message extracting unit 153 extracts the key data (BCH) and the regulation notification from the broadcast message and outputs the extracted key data (BCH) and the regulation notification to the call regulating unit 154.

If the call regulating unit 154 receives an input of the key data (PCH), the call regulating unit 154 stores the key data (PCH) in the storing unit 155. Furthermore, if the call regulating unit 154 receives an input of the key data (BCH) and the regulation notification, the call regulating unit 154 compares the input key data (BCH) with the key data (PCH) that is stored in the storing unit 155. Furthermore, if the call regulating unit 154 receives an input of the regulation notification, the call regulating unit 154 determines, in accordance with the comparison result between the key data (BCH) and the key data (PCH), whether the call regulation needs to be performed on the basis of <Case 1> to <Case 3> described below. If the call regulating unit 154 does not perform the call regulation, the call regulating unit 154 allows the wireless communication unit 152 to send a transmission signal, whereas, if the call regulating unit 154 performs the call regulation, the call regulating unit 154 prohibits the wireless communication unit 152 from sending the transmission signal.

<Case 1>: When a regulation notification is input, the input key data (BCH) matches the key data (PCH) stored in the storing unit 155. In this case, the call regulating unit 154 determines that, although the regulation notification is received, the communication terminal 15 is not targeted for the call regulation and thus does not perform the call regulation on the communication terminal 15.

<Case 2>: When a regulation notification is input, the key data (PCH) is not stored in the storing unit 155. In this case, the call regulating unit 154 determines that the communication terminal 15 is targeted for the call regulation and performs the call regulation on the communication terminal 15 in accordance with the regulation notification.

<Case 3>: When a regulation notification is input, the input key data (BCH) is different from the key data (PCH) that is stored in the storing unit 155. In this case, the call regulating unit 154 determines that the communication terminal 15 is targeted for the call regulation and performs the call regulation on the communication terminal 15 in accordance with the regulation notification.

<Process Performed by the Communication Terminal>

Figure 5:
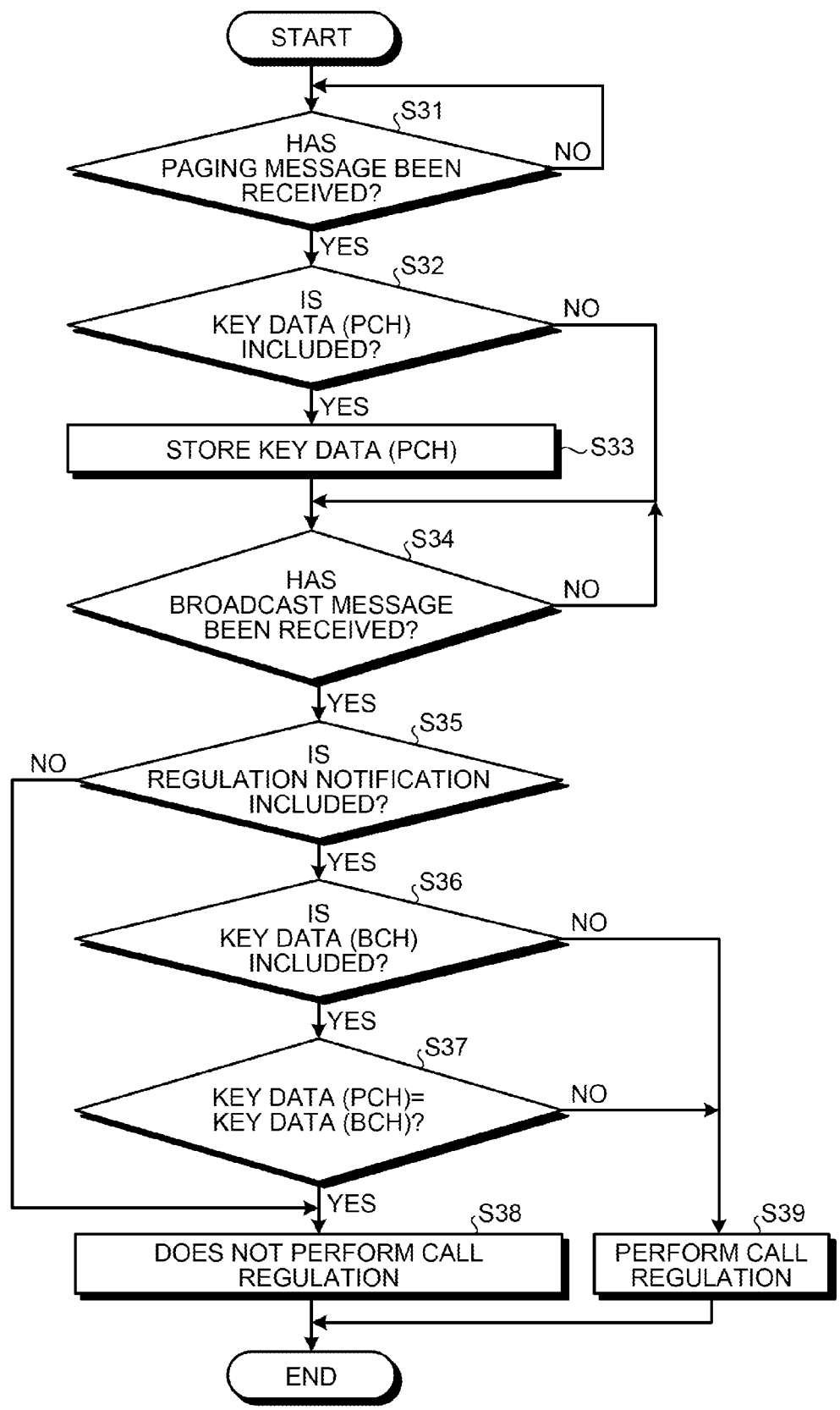
FIG. 5 is a flowchart illustrating the flow of a process performed by the communication terminal according to the first embodiment.

FIG. 5 is a flowchart illustrating the flow of a process performed by the communication terminal according to the first embodiment.

In the communication terminal 15, the wireless communication unit 152 repeats a receiving process until a paging message is received (No at Step S31).

If the wireless communication unit 152 receives a paging message (Yes at Step S31), the message extracting unit 153 determines whether the paging message includes the key data (PCH) (Step S32).

If the paging message includes the key data (PCH) (Yes at Step S32), the call regulating unit 154 stores the key data (PCH) in the storing unit 155 (Step S33).

If the paging message is not included in the key data (PCH) (No at Step S32), the key data (PCH) is not stored in the storing unit 155 and the process proceeds to Step S34.

Then, the wireless communication unit 152 repeats the receiving process until a broadcast message is received (No at Step S34).

If the wireless communication unit 152 receives a broadcast message (Yes at Step S34), the message extracting unit 153 determines whether the broadcast message includes therein the regulation notification (Step S35).

If the broadcast message includes the regulation notification (Yes at Step S35), the message extracting unit 153 determines whether the broadcast message includes therein the key data (BCH) (Step S36).

If the broadcast message includes therein the key data (BCH) (Yes at Step S36), the call regulating unit 154 determines whether the key data (BCH) included in the broadcast message matches the key data (PCH) that has been stored at Step S33 (Step S37).

At Step S37, if the key data (BCH) matches the key data (PCH) (Yes at Step S37), the call regulating unit 154 does not perform the call regulation (Step S38). Furthermore, at Step S35, if the broadcast message does not include therein the regulation notification (No at Step S35), the call regulating unit 154 does not perform the call regulation (Step S38).

In contrast, at Step S36, if the broadcast message does not includes therein the key data (BCH) (No at Step S36), the call regulating unit 154 performs the call regulation (Step S39). Furthermore, at Step S37, if the key data (BCH) is different from the key data (PCH) (No at Step S37), the call regulating unit 154 performs the call regulation (Step S39).

Furthermore, at Step S32, if the paging message does not include therein the key data (PCH), the key data (PCH) is not stored in the storing unit 155. Consequently, the key data (BCH) does not match the key data (PCH) and thus the determination result obtained at Step S37 is "No". Namely, if the key data (PCH) is not received before the key data (BCH) is received, the determination result obtained at Step S37 is "No" and thus the call regulating unit 154 performs the call regulation (Step S39).

<Specific Example of Key Data>

FIG. 6 is a schematic diagram illustrating an example of key data according to the first embodiment. As illustrated in FIG. 6, the key data is unique key data for each base station. For example, the key data of '11111111' is previously allocated to the base station BS1, the key data of '22222222' is allocated to the base station BS2, the key data of '33333333' is allocated to the base station BS3.

<Specific Example of a Paging Message>

FIG. 7 is a schematic diagram illustrating an example of a paging message according to the first embodiment. A paging message includes therein, as the message items, "pagingRecordList", "systemInfoModification", and "nonCriticalExtention". The "pagingRecordList" stores therein the ID list for identifying communication terminals at the destination of incoming calls. The "systemInfoModification" stores therein a notification indicating whether a broadcast message has been changed. The "nonCriticalExtention" includes therein the item of the paging factor and the item of key data. The item of the paging factor stores therein a notification indicating whether key data is present. The item of the key data stores therein key data (PCH).

<Specific Example of a Broadcast Message>

Figure 8:
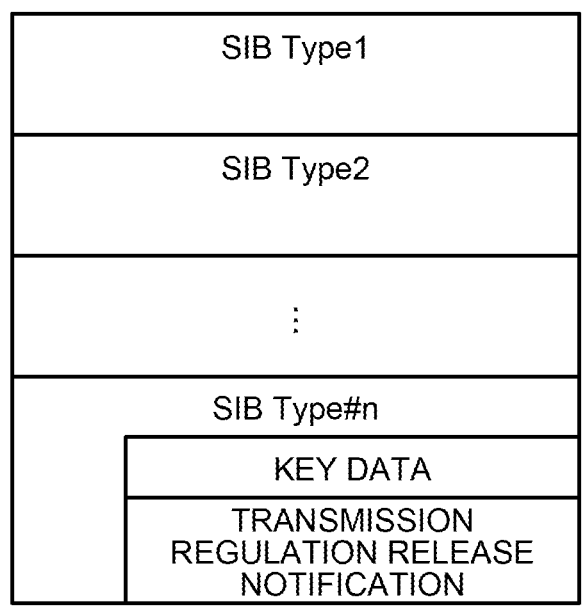
FIG. 8 is a schematic diagram illustrating an example of a broadcast message according to the first embodiment.

FIG. 8 is a schematic diagram illustrating an example of a broadcast message according to the first embodiment. A broadcast message includes therein, as the message items, a plurality of SIB items of "system information block (SIB) Type 1" to "SIB Type #n". The "SIB Type 1" stores therein a regulation notification and scheduling information on other SIB Types. The "SIB Type 2" stores therein, as information indicating the communication resource, information on each channel. The "SIB Type #n" includes therein the item of key data and the item of a transmission regulation release notification. The item of the key data stores therein the key data (BCH). The item of the transmission regulation release notification stores therein a transmission regulation release notification (hereinafter, may sometimes simply be referred to as a "regulation release notification") indicating that the call regulation performed on a base station that is the send source of a broadcast message is to be released.

<Specific Example of Call Regulation Process Performed by a Communication Terminal>

Figure 9:
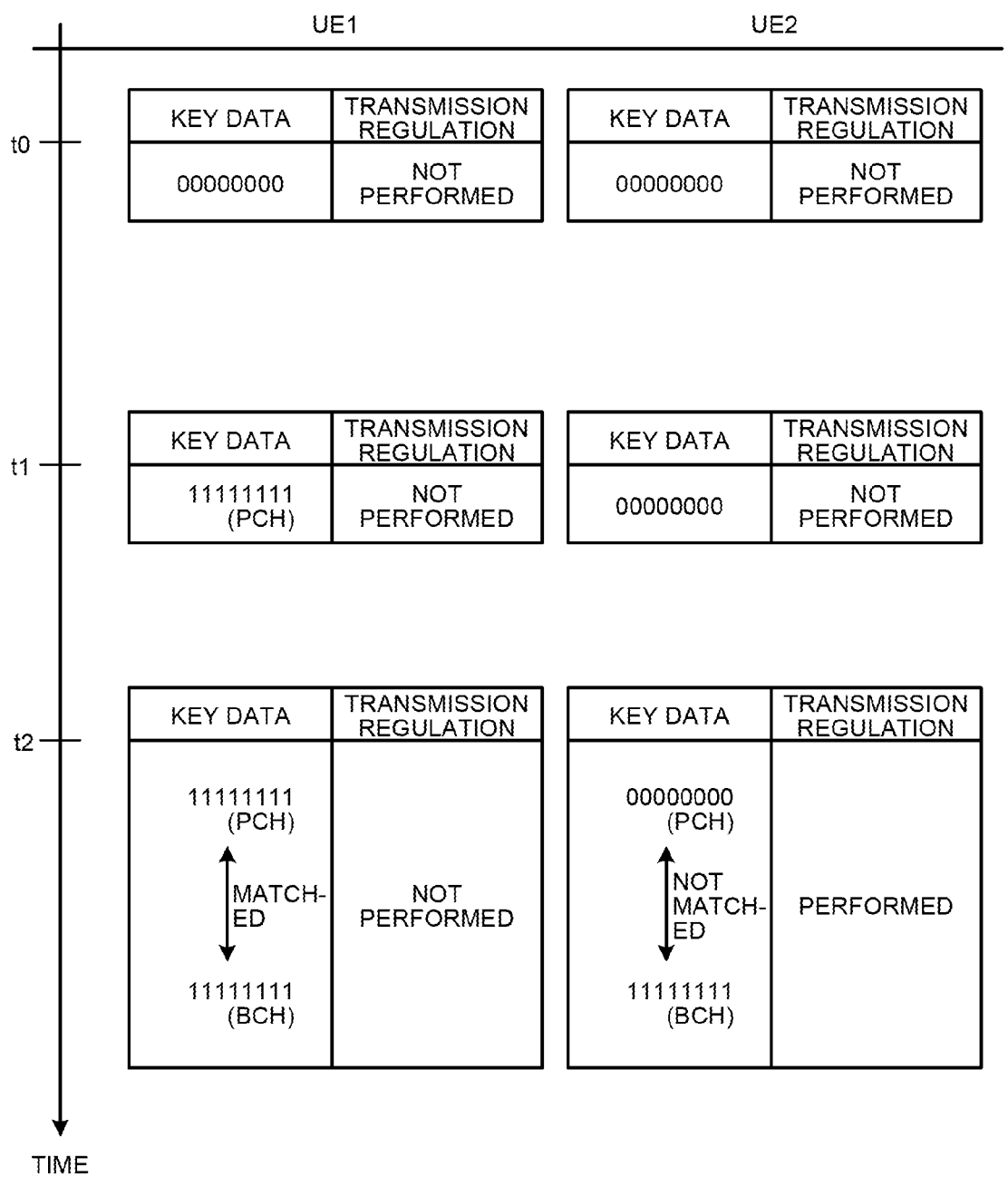
FIG. 9 is a schematic diagram illustrating a call regulation process according to the first embodiment.

FIG. 9 is a schematic diagram illustrating a call regulation process according to the first embodiment. In FIG. 9, the communication terminals UE1-1 and UE1-2 illustrated in FIG. 1 are represented by "UE1" and the communication terminals UE2-1 and UE2-2 illustrated in FIG. 1 are represented by "UE2".

It is assumed that the state of time t0 is the initial state and it is assumed that, at the time to, "00000000" is stored, as the initial value of the key data, in both the storing unit 155 in the communication terminal UE1 and the storing unit 155 in the communication terminal UE2. Furthermore, at the time t0, the communication terminal UE1 and the communication terminal UE2 do not perform the call regulation.

At time t1, the base station BS1 sends the key data (PCH) of "11111111". Because the communication terminal UE1 is accommodated in the base station BS1, the communication terminal UE1 receives the key data (PCH) of "11111111" sent from the base station BS1 and then stores the received key data (PCH) in the storing unit 155. In contrast, because the communication terminal UE2 is not accommodated in the base station BS1, the communication terminal UE2 is not capable of receiving the key data (PCH) of "11111111" sent from the base station BS1. Consequently, at the time t1, the key data (PCH) stored in the storing unit 155 in the communication terminal UE1 is updated from "00000000" to "11111111", whereas the key data (PCH) stored in the storing unit 155 in the communication terminal UE2 is unchanged as "00000000". At the time t1, the communication terminal UE1 and the communication terminal UE2 do not perform the call regulation.

At time t2, the base station BS1 sends the key data (BCH) of "11111111" and the regulation notification. The key data (BCH) of "11111111" sent from the base station BS1 is received by both the communication terminal UE1 and the communication terminal UE2. In the communication terminal UE1, because the received key data (BCH) of "11111111" matches the key data (PCH) of "11111111" that is stored in the storing unit 155, this case corresponds to <Case 1> described above and thus the communication terminal UE1 does not perform call regulation at the time t2. In contrast, in the communication terminal UE2, because the received key data (BCH) of "11111111" is different from the key data (PCH) of "00000000" that is stored in the storing unit 155, this case corresponds to <Case 3> described above and thus the communication terminal UE2 performs the call regulation at the time t2.

Furthermore, in the initial state at the timing t0, the key data does not necessarily have to be stored in both the storing unit 155 in the communication terminal UE1 and the storing unit 155 in the communication terminal UE2. If the key data is not stored at the time t0, because the state of the UE2 at the time t2 corresponds to <Case 2> described above, the communication terminal UE2 performs the call regulation at the time t2.

<Process Performed by the Communication System>

Figure 10:
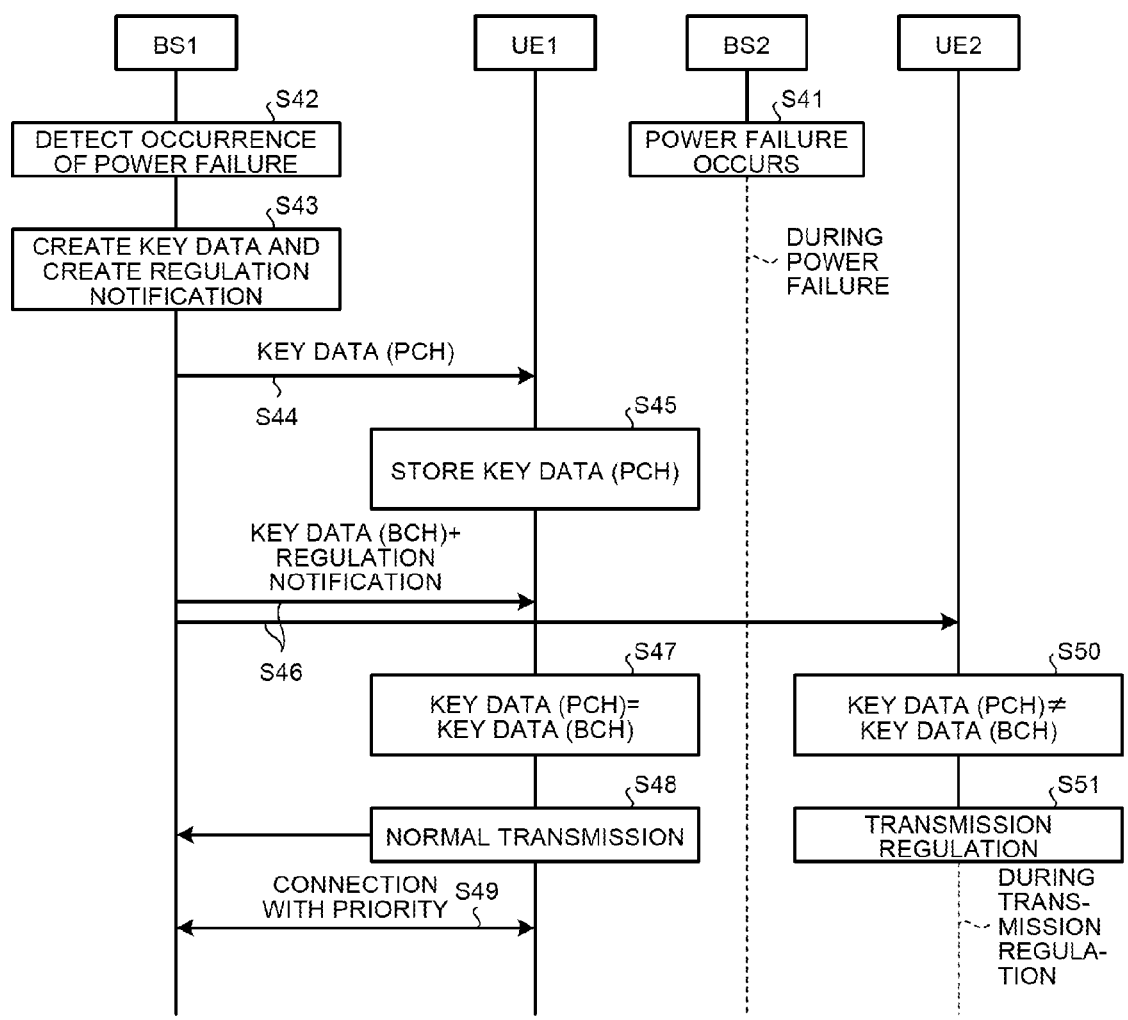
FIG. 10 is a sequence diagram illustrating a process performed by the communication system according to the first embodiment.
Figure 11:
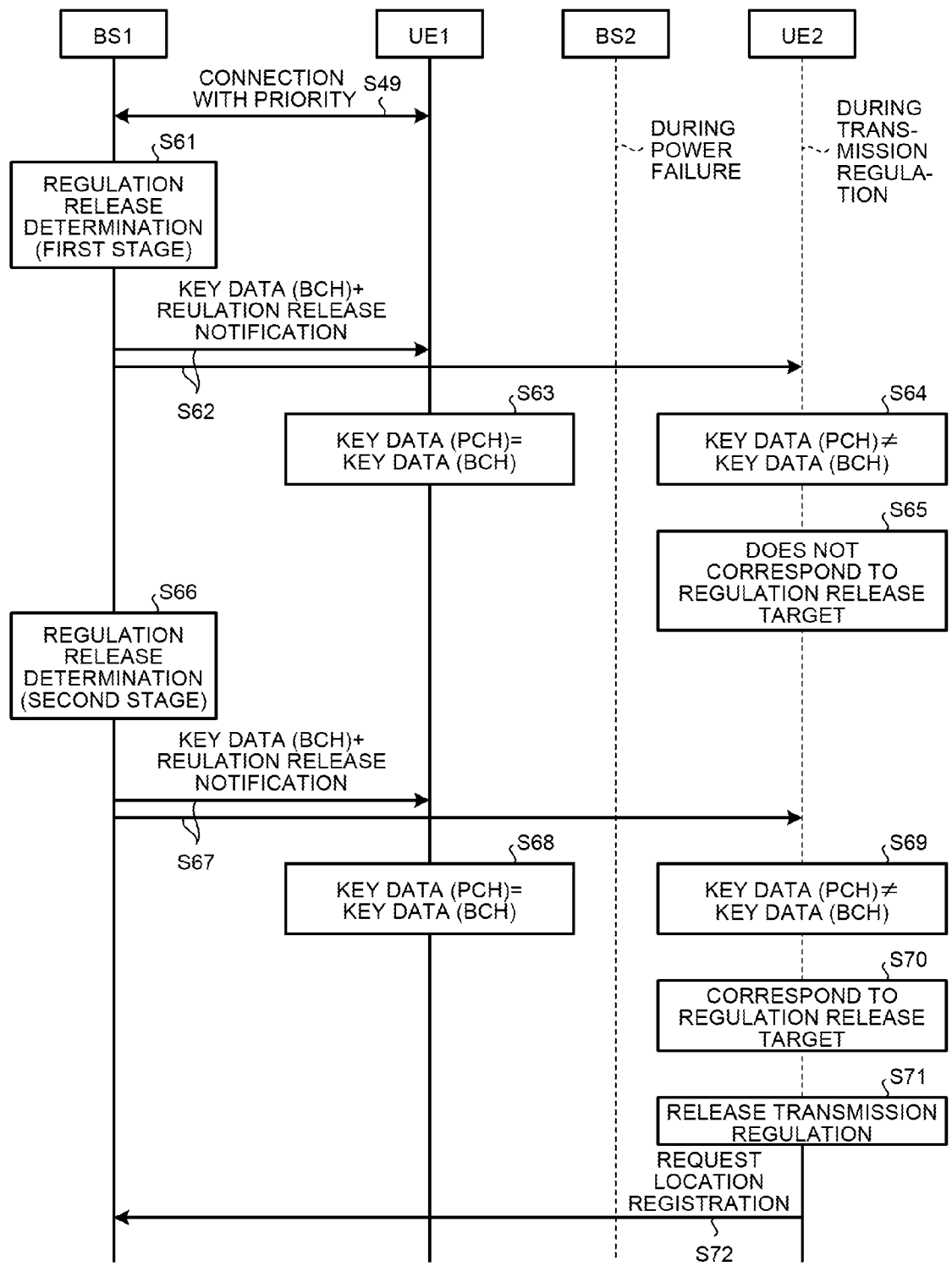
FIG. 11 is a sequence diagram illustrating a process performed by the communication system according to the first embodiment.
Figure 12:
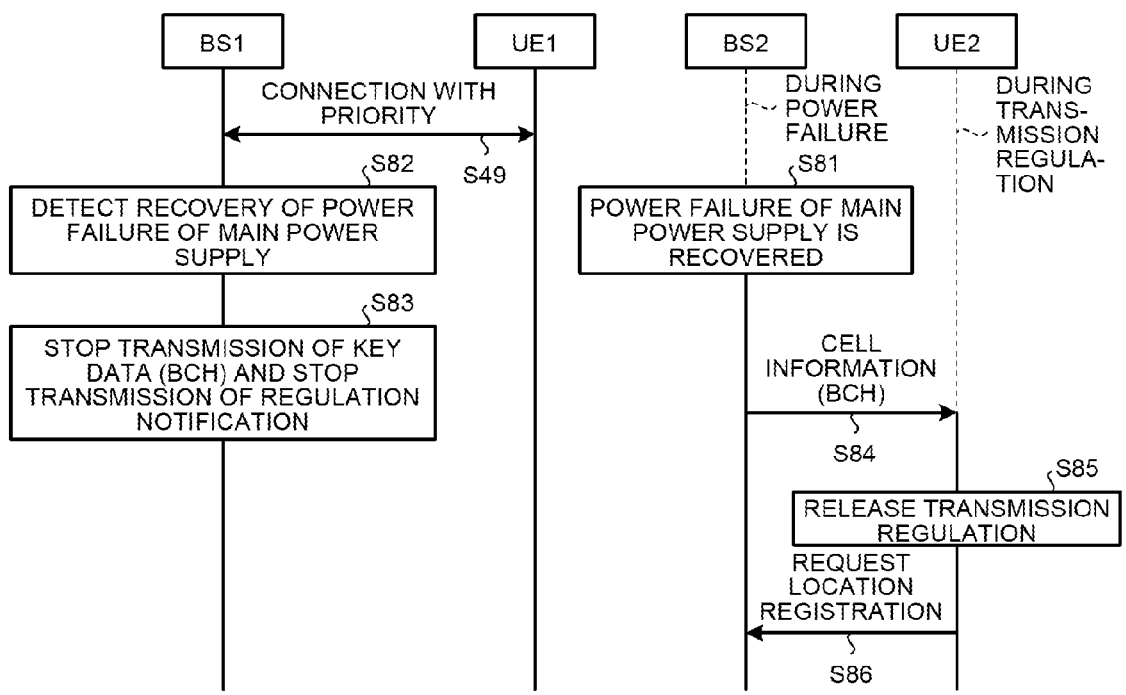
FIG. 12 is a sequence diagram illustrating a process performed by the communication system according to the first embodiment.

FIGS. 10 to 12 are sequence diagrams each illustrating a process performed by the communication system according to the first embodiment. In FIGS. 10 to 12, the communication terminals UE1-1 and UE1-2 illustrated in FIG. 1 are represented by "UE1" and the communication terminals UE2-1 and UE2-2 illustrated in FIG. 1 are represented by "UE2".

First, the sequence of the process performed when the call regulation is performed will be described with reference to FIG. 10.

As illustrated in FIG. 10, if a power failure of the main power supply occurs in the base station BS2 (Step S41), the base station BS1 detects the occurrence of the power failure (Step S42). In the base station BS2, at Step S41 and the subsequent steps, the power failure continues in the main power supply.

When the base station BS1 detects the occurrence of the power failure of the main power supply in the base station BS2, the base station BS1 creates key data and a regulation notification (Step S43).

Then, the base station BS1 sends the key data (PCH) by using the PCH. The key data (PCH) is received by the communication terminal UE1 and is stored (Steps S44 and S45).

Then, the base station BS1 sends the key data (BCH) and the regulation notification by using the BCH. The key data (BCH) and the regulation notification are received by the communication terminal UE1 and the communication terminal UE2 (Step S46). The key data (BCH) sent at Step S46 is the same key data (PCH) that has been sent at Step S44.

Because the communication terminal UE1 has received the key data (PCH) at Step S44, the key data (BCH) that has been received at Step S46 matches the key data (PCH) (Step S47) in the communication terminal UE1. Consequently, the communication terminal UE1 does not perform the call regulation even though the communication terminal UE1 has received the regulation notification at Step S46 and normally performs transmission with respect to the base station BS1 (Step S48).

In contrast, because the communication terminal UE2 does not receive the key data (PCH) at Step S44, the key data (BCH) received at Step S46 does not match the key data (PCH) in the communication terminal UE2 (Step S50). Consequently, the communication terminal UE2 performs the call regulation in accordance with the regulation notification received at Step S46 (Step S51). In the communication terminal UE2, the call regulation is continued at Step S51 and the subsequent steps.

As described above, the call regulation is performed in the communication terminal UE2; however, the call regulation is not performed in the communication terminal UE1. Consequently, the communication terminal UE1 is connected to the base station BS1 with higher priority than the communication terminal UE2 (Step S49).

In the following, the sequence of the process performed when the call regulation is released will be described with reference to FIG. 11.

In FIG. 11, as described with reference to FIG. 10, first, the communication terminal UE1 is connected to the base station BS1 such that priority is given to the communication terminal UE1 (Step S49). Furthermore, the main power supply of the base station BS2 is failing. Furthermore, the communication terminal UE2 is in the state of call regulation.

The base station BS1 determines whether call regulation in a first stage is to be released (Step S61). The base station BS1 monitors the number of communication terminals accommodated in the own station and determines whether the number of the communication terminals becomes less than a first threshold. If the number of the communication terminals becomes less than the first threshold, the base station BS1 creates a regulation release notification in the first stage and sends the key data (BCH) and the regulation release notification by using the BCH (Step S62). The key data (BCH) and the regulation release notification are received by the communication terminal UE1 and the communication terminal UE2 (Step S62).

At this point, the regulation release notification includes therein information for identifying a communication terminal that is targeted for a release of the call regulation, for example, a communication terminal ID for uniquely specifying a communication terminal targeted for a release of the call regulation. In this case, it is assumed that the communication terminal ID of the communication terminal UE2 is not included in the regulation release notification that is sent at Step S62. Namely, it is assumed that the communication terminal UE2 was not targeted for the release of the call regulation performed in the first stage. The monitoring of the number of communication terminals accommodated in the own station, the determination of a release of the call regulation, and the creation of a regulation release notification is performed by the regulation information creating unit 102.

Similarly to Step S47, in the communication terminal UE1, because the key data (BCH) received at Step S62 matches the key data (PCH), the call regulation is not performed (Step S63).

In contrast, in the communication terminal UE2, the key data (BCH) received at Step S62 does not match the key data (PCH) (Step S64). Furthermore, the communication terminal UE2 does not also correspond to the target for the release of the call regulation indicated by the regulation release notification (Step S65). Accordingly, although the communication terminal UE2 has received the regulation release notification at Step S62, the communication terminal UE2 continues to perform the call regulation.

Then, the base station BS1 determines whether call regulation performed in a second stage is to be released (Step S66). The base station BS1 determines whether the number of communication terminals accommodated in the own station becomes less than a second threshold that is smaller than the first threshold. When the number of communication terminals accommodated in the own station becomes less than the second threshold, the base station BS1 creates a regulation release notification in the second stage and sends the key data (BCH) and the regulation release notification by using the BCH (Step S67). The key data (BCH) and the regulation release notification are received by the communication terminal UE1 and the communication terminal UE2 (Step S67). In this case, it is assumed that the communication terminal ID of the communication terminal UE2 is included in the regulation release notification that is sent at Step S67. Namely, it is assumed that the communication terminal UE2 becomes the targeted for a release of the call regulation performed in the second stage.

Similarly to Step S47, in the communication terminal UE1, because the key data (BCH) received at Step S67 matches the key data (PCH), the call regulation is not performed (Step S68).

In contrast, in the communication terminal UE2, the key data (BCH) received at Step S67 does not match the key data (PCH) (Step S69). However, the communication terminal UE2 corresponds to the target for the release of the call regulation that is indicated by the regulation release notification (Step S70). Accordingly, the communication terminal UE2 releases the call regulation in accordance with the regulation release notification received at Step S67 (Step S71). Because the communication terminal UE2 that has released the call regulation performs a cell search on a base station in the vicinity of the own terminal. Because the main power supply of the base station BS2 that is present in the closest location to the communication terminal UE2 is in a power failure state, the base station BS2 is out of target for the cell search performed by the communication terminal UE2. In contrast, because the communication terminal UE2 is located in the cell 1 formed by the base station BS1, the communication terminal UE2 detects the base station BS1 by performing the cell search and requests the detected base station BS1 to register the location (Step S72).

In the following, the sequence of the processes performed when the main power supply of the base station BS2 is recovered will be described with reference to FIG. 12.

In FIG. 12, as described with reference to FIG. 10, first, the communication terminal UE1 is connected to the base station BS1 such that priority is given to the communication terminal UE1 (Step S49). Furthermore, the main power supply of the base station BS2 is in a power failure state. Furthermore, the communication terminal UE2 currently performs the call regulation.

In the base station BS2, if a power failure of the main power supply is recovered and a supply of the electrical power from the main power supply to the base station BS2 is resumed (Step S81), the base station BS1 detects the recovery of the power failure (Step S82). The detection performed by the base station BS1 is performed on the basis of the detection indicating that the power supply that supplies electrical power to the base station BS1 is switched from the standby power supply to the main power supply. The detection of the switching of the power supply from the main power supply to the standby power supply is performed by the electrical power supply monitoring unit 101.

The base station BS1 that has detected the recovery of the power failure of the main power supply stops the transmission of the key data (BCH) and stops the transmission of the regulation notification (Step S83).

Because the power failure of the main power supply has been recovered, the base station BS2 resumes the transmission of a broadcast message that includes therein cell information on the cell 2 by using the BCH and the communication terminal UE2 detects the broadcast message by using the cell search (Step S84). This broadcast message includes therein the base station ID of the base station BS2. Namely, the communication terminal UE2 detects the base station BS2 by using the cell search.

Because the communication terminal UE2 is accommodated in the base station BS2, the base station ID of the base station BS2 is stored in the storing unit 155. Consequently, in the communication terminal UE2, the base station ID included in the broadcast message detected at Step S84 matches the base station ID stored in the storing unit 155. Furthermore, because the base station BS2 is the base station that is present in the closest location to the communication terminal UE2, in the communication terminal UE2, the broadcast message reception level from the base station BS2 is higher than the reception level of the broadcast message sent from the base station BS1. Accordingly, the communication terminal UE2 that has detected the base station BS2 releases the call regulation (Step S85) and requests the detected base station BS2 to register the location (Step S86).

In the above, the first embodiment has been described.

[b] Second Embodiment

A second embodiment is different from the first embodiment in that a different method of detecting a stop of a supply of electrical power to another base station is used.

<Configuration of a Communication System>

Figure 13:
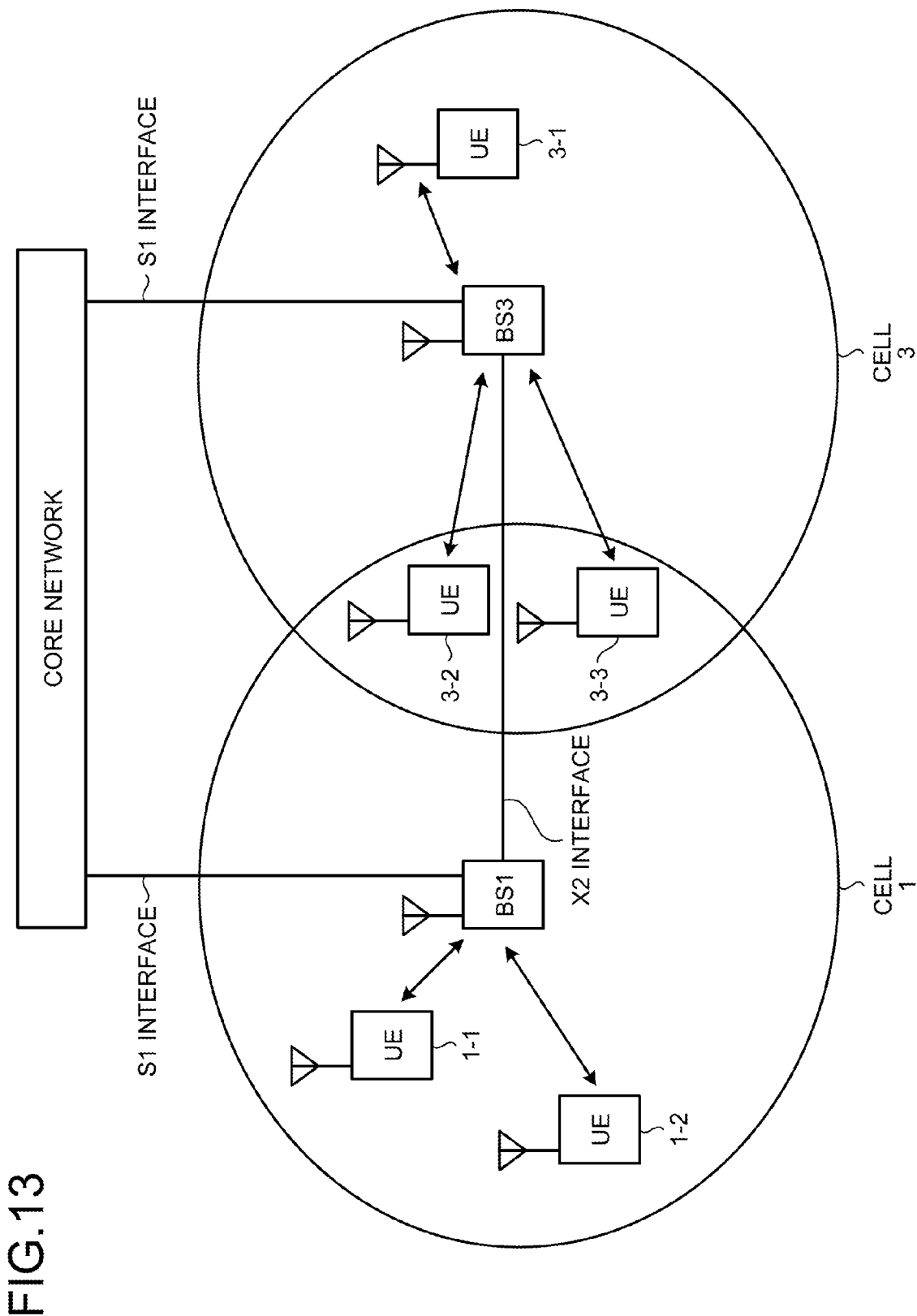
FIG. 13 is a schematic diagram illustrating an example of a communication system according to a second embodiment.

FIG. 13 is a schematic diagram illustrating an example of a communication system according to a second embodiment. As illustrated in FIG. 13, similarly to FIG. 1 in the first embodiment, the base station BS1 forms the cell 1, which is the communication area of the own station, and accommodates the communication terminals UE1-1 and UE1-2. In contrast, a base station BS3 forms a cell 3, which is the communication area of the own station, and accommodates communication terminals UE3-1, UE3-2, and UE3-3. The cell 1 and the cell 3 are macrocells. Furthermore, at the cell boundary between the cell 1 and the cell 3, a part of the cell 1 and a part of the cell 3 are overlapped with each other. The communication terminals UE3-2 and UE3-3 are located in this overlapped area. Furthermore, the base station BS1 and the base station BS3 are directly connected by an X2 interface that is a wired transmission path. Furthermore, each of the base stations and a core network are directly connected by an S1 interface that is a wired transmission path. Accordingly, the base station BS1 and the base station BS3 are connected via the S1 interface and the core network.

<Configuration of a Base Station>

Figure 14:
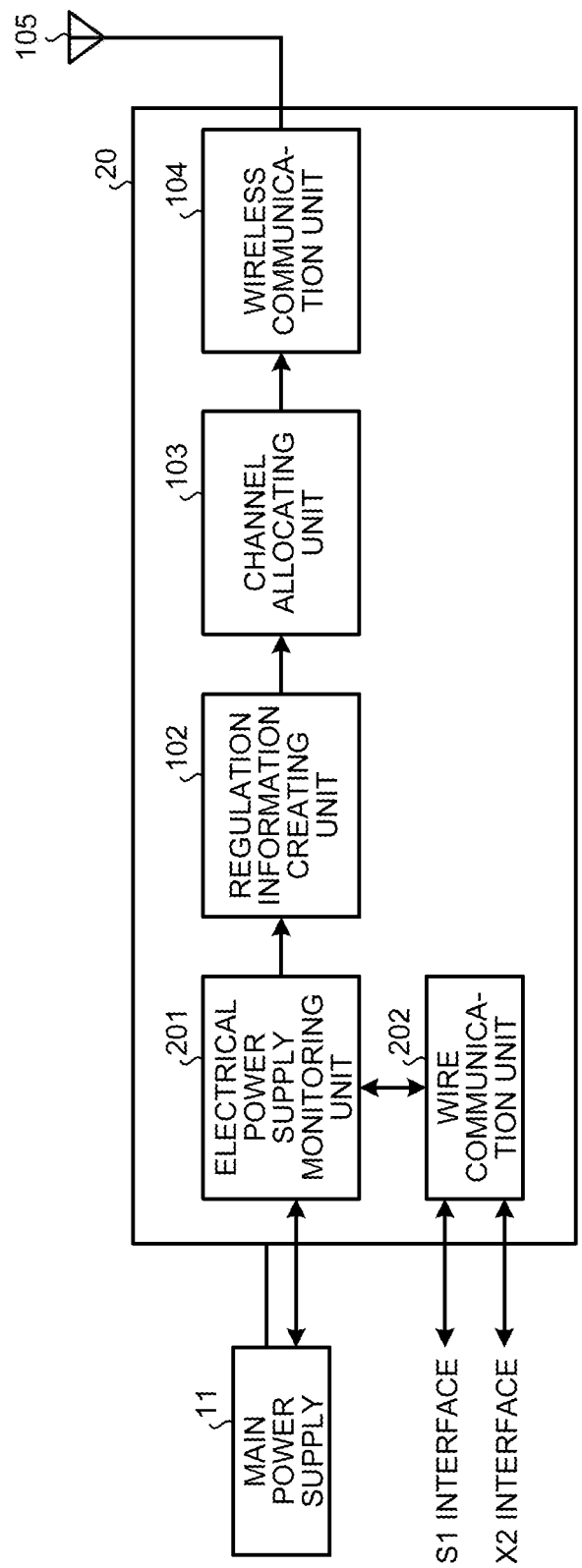
FIG. 14 is a functional block diagram illustrating an example of a base station according to the second embodiment.

FIG. 14 is a functional block diagram illustrating an example of a base station according to the second embodiment. A base station 20 illustrated in FIG. 14 corresponds to the base station BS1 and the base station BS3 illustrated in FIG. 13.

In FIG. 14, the base station 20 includes an electrical power supply monitoring unit 201, a wire communication unit 202, the regulation information creating unit 102, the channel allocating unit 103, the wireless communication unit 104, and the antenna 105. In the following, a description will be given of a case in which, as an example, a power failure does not occur in the base station BS1 and a power failure occurs in the base station BS3.

The wire communication unit 202 is connected to the S1 interface and the X2 interface.

The electrical power supply monitoring unit 201 in the base station BS3 monitors whether a supply of electrical power from the main power supply 11 to the own station is stopped. If the electrical power supply monitoring unit 201 detects that the supply of the electrical power to the own station is stopped due to a power failure of the main power supply 11, the electrical power supply monitoring unit 201 outputs a detection notification to the wire communication unit 202 together with the base station ID of the own station. The wire communication unit 202 sends, to the base station BS1 via the S1 interface or the X2 interface, the detection notification and the base station ID that have been input from the electrical power supply monitoring unit 201.

Furthermore, the electrical power supply monitoring unit 201 in the base station BS1 monitors, on the basis of the detection notification and the base station ID input from the wire communication unit 202, whether a supply of the electrical power to the base station BS3 is stopped. Namely, if a supply of the electrical power to the base station BS3 is stopped due to a power failure of the main power supply 11 in the base station BS3, the wire communication unit 202 in the base station BS1 receives the detection notification of the base station BS3 and the base station ID of the base station BS3 from the base station BS3 via the S1 interface or the X2 interface. The wire communication unit 202 in the base station BS1 outputs the received detection notification and the base station ID to the electrical power supply monitoring unit 201. The electrical power supply monitoring unit 201 in the base station BS1 detects, as a stop of a supply of the electrical power to the base station BS3, that the detection notification of the base station BS3 and the base station ID of the base station BS3 has been received. When the electrical power supply monitoring unit 201 in the base station BS1 detects that a supply of the electrical power to the base station BS3 is stopped, the electrical power supply monitoring unit 201 outputs the detection notification to the regulation information creating unit 102.

The subsequent processes are the same as those performed in the first embodiment. Namely, the base station BS1 sends the key data (PCH) by using the PCH and sends, after sending the key data (PCH), the key data (BCH) and the regulation notification by using the BCH. The communication terminals UE1-1 and UE1-2 are accommodated in the base station BS1, whereas the communication terminals UE3-1, UE3-2, and UE3-3 are accommodated in the base station BS3. Consequently, from among the communication terminals UE1-1, UE1-2, UE3-2, and UE3-3 located in the cell 1, the key data (PCH) is received by the communication terminals UE1-1 and UE1-2 but is not received by the communication terminals UE3-2 and UE3-3. Furthermore, the key data (BCH) and the regulation notification are received by all of the communication terminals located in the cell 1. Thus, from among the communication terminals UE1-1 UE1-2, UE3-2, and UE3-3 located in the cell 1, transmission from the communication terminals UE1-1 and UE1-2 is not regulated, whereas transmission from the communication terminals UE3-2 and UE3-3 is regulated.

In the above, the second embodiment has been described.

As described above, according to the first embodiment and the second embodiment, in the base stations 10 and 20, the electrical power supply monitoring units 101 and 201 respectively monitors whether a supply of electrical power to another base station that forms another communication area that is overlapped with the communication area that is formed by the own station. When a supply of electrical power to the other base station is stopped, the wireless communication unit 104 sends the key data (PCH) by using the PCH and sends, after sending the key data (PCH), the key data (BCH) that is the same data as the key data (PCH) and the regulation notification by using the BCH.

In contrast, in the communication terminal 15, the wireless communication unit 152 is capable of receiving the key data (PCH) by using the PCH and is also capable of receiving the key data (BCH) and the regulation notification by using the BCH. If the regulation notification is received and the received key data (BCH) matches the received key data (PCH), the call regulating unit 154 does not regulate the transmission from the own terminal. Furthermore, if the regulation notification is received and the key data (PCH) is not received before the key data (BCH) is received, the call regulating unit 154 regulates the transmission from the own terminal. Furthermore, if the regulation notification is received and the received key data (BCH) is different from the received key data (PCH), the call regulating unit 154 regulates the transmission from the own terminal.

By doing so, if a supply of electrical power to another base station that forms another communication area that is overlapped with the communication area that is formed by the own station is stopped, the base stations 10 and 20 can regulate the transmission to the own station from a communication terminal accommodated in the other base station. Consequently, the base stations 10 and 20 can prevent the occurrence of congestion in the communication area formed by the own station.

Furthermore, by sending the key data (PCH) and the key data (BCH), the base stations 10 and 20 can limit communication terminals targeted for the call regulation performed in accordance with the regulation notification to the communication terminals accommodated in the other base station in which a supply of electrical power is stopped. In other words, by sending the key data (PCH) and the key data (BCH), the base stations 10 and 20 can exclude the communication terminals that are accommodated in the own station and in which a supply of electrical power is not stopped from the target for the call regulation that is performed in accordance with the regulation notification. Consequently, because the base stations 10 and 20 can connect, with priority, the communication terminal accommodated in the own station to the own station, the communication terminal can regulate the transmission from the communication terminal accommodated in the other base station to the own station without adversely affecting communication with the communication terminal accommodated in the own station.

Namely, according to the first embodiment and the second embodiment, when a supply of electrical power to a base station whose communication area is overlapped with another base station is stopped, it is possible to prevent the occurrence of congestion in the communication area that is formed by the other base station without adversely affecting communication with the communication terminal accommodated in the other base station.

Furthermore, according to the first embodiment, in the base station 10, the electrical power supply monitoring unit 101 detects, as a stop of a supply of the electrical power to the other base station, that the electrical power supply source to the own station has been switched from the main power supply 11 to the standby power supply 13 that is arranged in case of a power failure of the main power supply 11. By doing so, the base station 10 can detect that a supply of the electrical power to the other base station has been stopped without exchanging information with the other base station. Namely, the base station 10 can independently detect that a supply of the electrical power to the other base station is stopped. Consequently, when compared with a case in which the call regulation is performed in accordance with a notification from the other base station or the core network, the base station 10 can more quickly perform the call regulation on the communication terminal accommodated in the other base station.

Furthermore, with conventional communication terminals that do not have a function of comparing the key data (PCH) with the key data (BCH), the call regulation may be performed, as is conventionally done, in accordance with a regulation notification sent from the base stations 10 and 20.

[c] Third Embodiment

A third embodiment differs from the first embodiment in that the base station also sends a regulation notification to another base station.

<Configuration of a Base Station>

Figure 15:
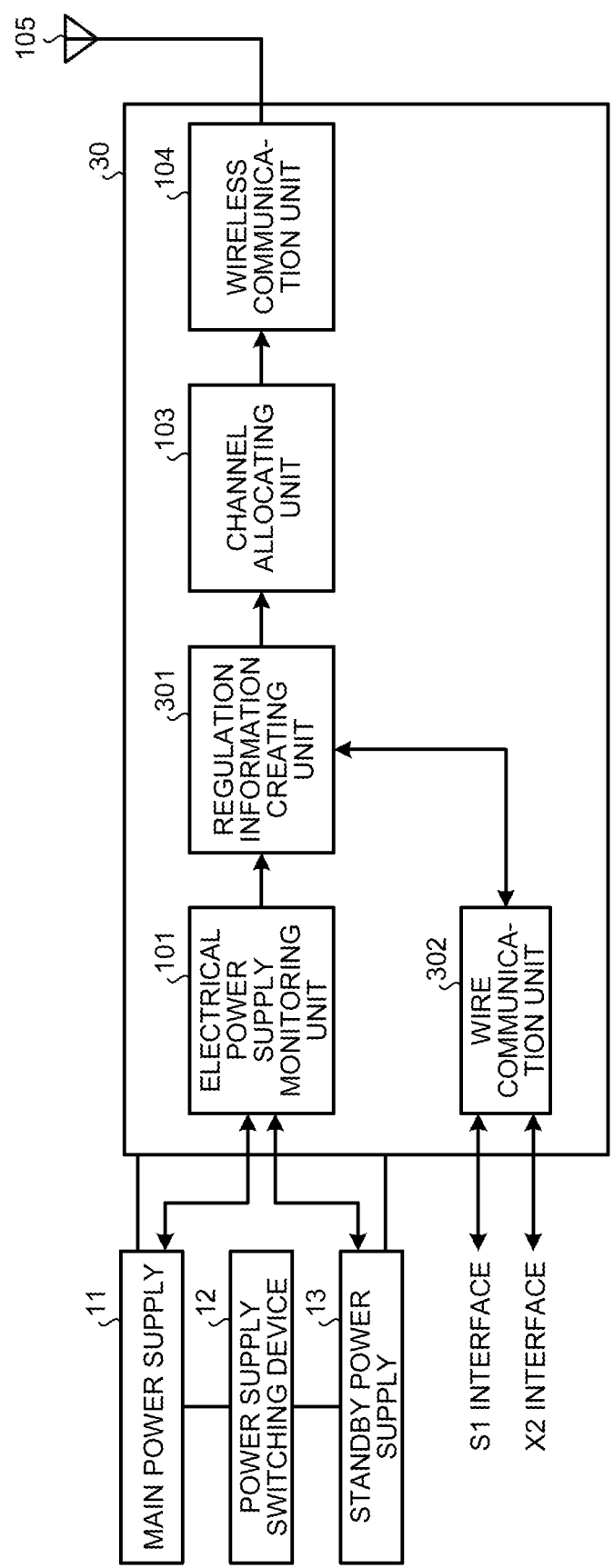
FIG. 15 is a functional block diagram illustrating an example of a base station according to a third embodiment.

FIG. 15 is a functional block diagram illustrating an example of a base station according to a third embodiment. A base station 30 illustrated in FIG. 15 corresponds to the base station BS1 illustrated in FIG. 1 and the base station BS3 illustrated in FIG. 13. Furthermore, in the third embodiment, as illustrated in FIG. 13, the base station BS1 is connected to the base station BS3 that forms the cell 3, which is a macrocell, via the S1 interface and the X2 interface.

In FIG. 15, the base station 30 includes the electrical power supply monitoring unit 101, a regulation information creating unit 301, a wire communication unit 302, the channel allocating unit 103, the wireless communication unit 104, and the antenna 105.

The wire communication unit 302 is connected to the S1 interface and the X2 interface.

Similarly to the first embodiment, when the electrical power supply monitoring unit 101 in the base station BS1 detects that a supply of the electrical power to the base station BS2 illustrated in FIG. 1 is stopped, the electrical power supply monitoring unit 101 outputs the detection notification to the regulation information creating unit 301.

In addition to the processes performed by the regulation information creating unit 102 described in the first embodiment, the regulation information creating unit 301 in the base station BS1 further sends, to the wire communication unit 302, a regulation notification that has been created in accordance with the detection notification that is input from the electrical power supply monitoring unit 101. The wire communication unit 302 in the base station BS1 sends the regulation notification of the own station to the base station BS3 via the S1 interface or the X2 interface.

The wire communication unit 302 in the base station BS3 receives the regulation notification sent from the base station BS1 and outputs the received regulation notification to the regulation information creating unit 301. If the regulation notification sent from the base station BS1 is input to the wire communication unit 302, the regulation information creating unit 301 in the base station BS3 creates key data and a regulation notification in accordance with the regulation notification received from the base station BS1 and outputs the key data and the regulation notification to the channel allocating unit 103.

The subsequent processes are the same as those performed in the first embodiment; therefore, descriptions thereof will be omitted.

As described above, according to the third embodiment, the wire communication unit 302 in the base station BS1 sends a regulation notification of the own station to the base station BS3 that is different from the base station BS2 in which a supply of the electrical power is stopped, whereas the wire communication unit 302 in the base station BS3 receives the regulation notification sent from the base station BS1. By doing so, because the call regulation is performed in the cell 1 formed by the base station BS1, the base station BS3 can determine that several communication terminals that were accommodated in the base station BS2 are likely to simultaneously request the own station (BS3) to register their locations. Namely, on the basis of the regulation notification received from the base station BS1, the base station BS3 can also determine that congestion of communication data is also likely to occur in the cell 3 that is formed by the own station. By performing control of the call regulation in the same manner as the base station BS1 in the first embodiment, the base station BS3 can prevent the occurrence of congestion in the cell 3 without adversely affecting communication with the communication terminal accommodated in the own station.

In the above, the third embodiment has been described.

[d] Other Embodiments

[1] In each of the embodiments described above, the descriptions have been given, as an example, of the femto base station that is not connected to the standby power supply. However, there may be a case in which, between the two femto base stations which form two femtocells a part of which are overlapped with each other, a femto base stations is connected to the standby power supply and another femto base stations is not connected to the standby power supply. In this case, the first femto base station connected to the standby power supply preferably regards as the base station BS1 described in the first embodiment and the other femto base station that is not connected to the standby power supply preferably regards as the base station BS2 described in the first embodiment. By regarding the femto base stations in this way, even if both the femto base station that is connected to the standby power supply and the femto base station that is not connected to the standby power supply are present in the communication system, similarly to the first embodiment, the disclosed technology can be implemented.

Figure 16:
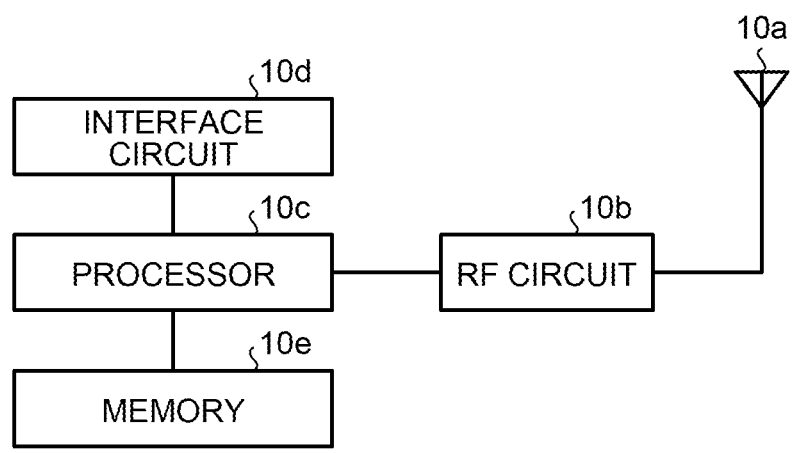
FIG. 16 is a schematic diagram illustrating an example of the hardware configuration of the base station.

[2] The base stations 10, 20, and 30 can be implemented by using the hardware configuration described below. FIG. 16 is a schematic diagram illustrating an example of the hardware configuration of the base station. As illustrated in FIG. 16, the base stations 10, 20, and 30 includes, as components of the hardware, an antenna 10a, a radio frequency (RF) circuit 10b, a processor 10c, a memory 10e, and an interface circuit 10d. An example of the processor 10c includes a central processing unit (CPU), a digital signal processor (DSP), a field programmable gate array (FPGA), or the like. Furthermore, the base stations 10, 20, and 30 may also include a large scale integrated circuit (LSI) that includes therein the processor 10c and a peripheral circuit. An example of the memory 10e includes a RAM, such as an SDRAM, a ROM, a flash memory, or the like. The antenna 105 is implemented by the antenna 10a. The electrical power supply monitoring units 101 and 201, the regulation information creating units 102 and 301, and the channel allocating unit 103 are implemented by the processor 10c. The wireless communication unit 104 is implemented by the RF circuit 10b. The wire communication units 202 and 302 are implemented by the interface circuit 10d.

Figure 17:
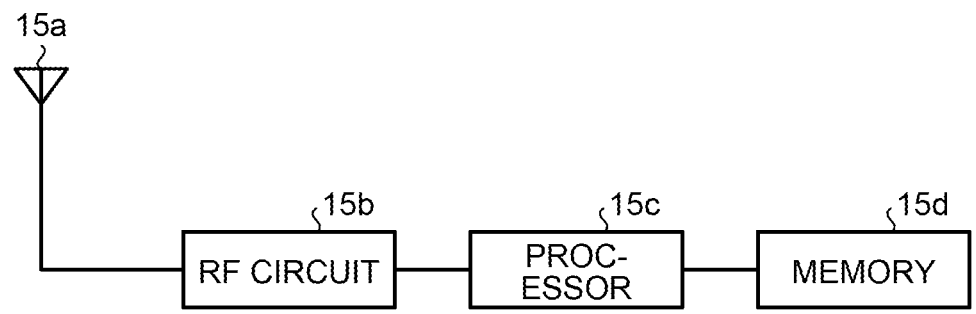
FIG. 17 is a schematic diagram illustrating an example of the hardware configuration of the communication terminal.

[3] The communication terminal 15 described above can be implemented by the following hardware configuration. FIG. 17 is a schematic diagram illustrating an example of the hardware configuration of the communication terminal. As illustrated in FIG. 17, the communication terminal 15 includes, as hardware components, an antenna 15a, an RF circuit 15b, a processor 15c, and a memory 15d. An example of the processor 15c includes a CPU, a DSP, an FPGA, or the like. Furthermore, the communication terminal 15 may also include an LSI circuit that includes therein the processor 15c and a peripheral circuit. An example of the memory 15d includes a RAM, such as an SDRAM, a ROM, a flash memory, or the like. The antenna 151 is implemented by the antenna 15a. The wireless communication unit 152 is implemented by the RF circuit 15b. The message extracting unit 153 and the call regulating unit 154 are implemented by the processor 15c. The storing unit 155 is implemented by the memory 15d.

[4] Various processes described in the above embodiments can be implemented by programs prepared in advance and executed by a CPU. For example, programs associated with processes executed by the electrical power supply monitoring units 101 and 201, the regulation information creating units 102 and 301, the channel allocating unit 103, the message extracting unit 153, and the call regulating unit 154 may also be stored in a memory in advance and each of the programs may also be read from the memory to the CPU, where the programs function as processes. Furthermore, each of the programs is not always stored in the memory in advance. Namely, for example, each of the programs may also be stored in advance in a portable recording medium, such as a flexible disk (FD), a CD-ROM, a DVD disk, a magneto-optic disk, an IC CARD, a memory card, or the like that can be inserted into the base stations 10, 20, and 30, or the communication terminal 15 and each of the programs is read from the recording medium to the CPU, where the programs function as processes. Furthermore each of the programs may also be stored in advance in a computer, a server, or the like that is connected to the base stations 10, 20, and 30 or the communication terminal 15 via, for example, the Internet, a LAN, a WAN, or the like by using a wireless or wired connection and each of the programs may also be read from the computer, the server, or the like to the CPU, where the programs function as processes.

[5] A specific name of the "communication area" described above is not limited to the "macrocell" nor the "femtocell".

According to an aspect of an embodiment of the present invention, an advantage is provided in that, when a supply of electrical power to a base station whose communication area is overlapped with another base station is stopped, it is possible to prevent the occurrence of congestion in the communication area that is formed by the other base station without adversely affecting communication with the communication terminal accommodated in the other base station.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A first base station comprising:
    a monitoring unit that monitors whether a supply of electrical power to a second base station that forms another communication area that is overlapped with a communication area formed by the first base station is stopped; and
    a wireless communication unit that sends, when the supply of the electrical power to the second base station is stopped, first key data by using a first channel through which a first communication terminal accommodated in the first base station is capable of receiving the first key data and a second communication terminal accommodated in the second base station is not capable of receiving the first key data and that sends, after sending the first key data, second key data that is the same as the first key data and a transmission regulation notification indicating that call regulation is performed on the first base station by using a second channel through which both the first communication terminal and the second communication terminal are capable of receiving the second key data and the transmission regulation notification, wherein
    the first communication terminal and the second communication terminal:
        perform a first determination whether the first key data is received by using the first channel;
        perform a second determination whether the second key data and the transmission regulation notification are received by using the second channel;
        do not regulate transmission when the transmission regulation notification is received and the received second key data matches the received first key data;
        regulate transmission when the transmission regulation notification is received and the first key data is not received before the second key data is received; and
        regulate transmission when the transmission regulation notification is received and the received second key data is different from the received first key data.

2. The first base station according to claim 1, wherein the monitoring unit detects, as the stop of the supply of the electrical power to the second base station, that an electrical power supply source to the first base station is switched from a main power supply to a standby power supply that is arranged in case of a power failure of the main power supply.

3. The first base station according to claim 1, further comprising a wire communication unit that sends the transmission regulation notification to a third base station that is different from the second base station in which the supply of the electrical power is stopped.

4. A call regulation control method performed by a first base station and a communication terminal, the first base station sending a transmission regulation notification indicating that call regulation is performed on the first base station, the communication terminal being capable of receiving the transmission regulation notification, the call regulation control method comprising:
    performing a first transmission of sending, when a supply of electrical power to a second base station that forms another communication area that is overlapped with a communication area formed by the first base station is stopped, first key data by using a first channel through which a first communication terminal accommodated in the first base station is capable of receiving the first key data and a second communication terminal accommodated in the second base station is not capable of receiving the first key data;
    performing a second transmission of sending, after performing the first transmission, second key data that is the same as the first key data and the transmission regulation notification by using a second channel through which both the first communication terminal and the second communication terminal are capable of receiving the second key data and the transmission regulation notification
    performing a first determination whether the first key data is received by using the first channel;
    performing a second determination whether the second key data and the transmission regulation notification are received by using the second channel;

not regulating transmission when the transmission regulation notification is received and the received second key data matches the received first key data;

regulating transmission when the transmission regulation notification is received and the first key data is not received before the second key data is received; and regulating transmission when the transmission regulation notification is received and the received second key data is different from the received first key data.

5. A call regulation control method performed by a communication terminal that is capable of receiving a transmission regulation notification indicating that call regulation is performed on a base station, the call regulation control method comprising:

performing a first determination whether first key data is received by using a first channel through which a first communication terminal accommodated in a first base station is capable of receiving the first key data and a second communication terminal accommodated in a second base station that forms another communication area overlapped with a communication area formed by the first base station is not capable of receiving the first key data;

performing a second determination whether second key data that is the same as the first key data and the transmission regulation notification are received by using a second channel through which both the first communication terminal and the second communication terminal are capable of receiving the second key data and the transmission regulation notification;

not regulating transmission when the transmission regulation notification is received and the received second key data matches the received first key data;

regulating transmission when the transmission regulation notification is received and the first key data is not received before the second key data is received; and regulating transmission when the transmission regulation notification is received and the received second key data is different from the received first key data.

* * * * *